(12) United States Patent
Atzmon et al.

(10) Patent No.: US 9,400,654 B2
(45) Date of Patent: Jul. 26, 2016

(54) SYSTEM ON A CHIP WITH MANAGING PROCESSOR AND METHOD THEREFOR

(71) Applicants: Nir Atzmon, Netanya (IL);
Ron-Michael Bar, Ramat-Hasharon (IL); Eran Glickman, Rishon le Zion (IL); Stas Yosupov, Gedera (IL)

(72) Inventors: Nir Atzmon, Netanya (IL);
Ron-Michael Bar, Ramat-Hasharon (IL); Eran Glickman, Rishon le Zion (IL); Stas Yosupov, Gedera (IL)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 214 days.

(21) Appl. No.: 14/316,876

(22) Filed: Jun. 27, 2014

(65) Prior Publication Data

US 2015/0378730 A1 Dec. 31, 2015

(51) Int. Cl.
*G06F 9/30* (2006.01)
*G06F 11/30* (2006.01)

(52) U.S. Cl.
CPC ........ *G06F 9/30145* (2013.01); *G06F 11/3024* (2013.01); *G06F 11/3055* (2013.01)

(58) Field of Classification Search
None
See application file for complete search history.

(56) References Cited

U.S. PATENT DOCUMENTS

| | | | |
|---|---|---|---|
| 6,931,568 B2 | 8/2005 | Abbondanzio et al. | |
| 2007/0038732 A1 | 2/2007 | Chandwani et al. | |
| 2007/0061646 A1* | 3/2007 | Whetsel | G01R 31/318572 714/726 |
| 2007/0226795 A1* | 9/2007 | Conti | G06F 21/74 726/22 |
| 2012/0102192 A1* | 4/2012 | Takeshima | H04L 29/12066 709/224 |
| 2012/0131309 A1* | 5/2012 | Johnson | G06F 9/30 712/41 |

* cited by examiner

*Primary Examiner* — William B Partridge

(57) ABSTRACT

A system on a chip comprises a managing processor for controlling operations of the system on a chip. The managing processor comprises a core monitor control logic circuit operable to: receive at least one instruction; determine whether the instruction is an activation instruction; determine whether the managing processor is in or transitioning to an idle state; and transition the managing processor from a first mode of operation to a second mode of operation in response to the instruction being an activation instruction and the managing processor being in or transitioning to an idle state.

19 Claims, 4 Drawing Sheets

SYSTEM ON A CHIP WITH MANAGING PROCESSOR AND METHOD THEREFOR

FIELD OF THE INVENTION

The field of this invention relates to a system on a chip having a managing processor and method therefor, and in particular to providing a managing processor with additional performance capabilities, such as monitoring capability during idle state periods.

BACKGROUND OF THE INVENTION

Utilising managing processors (MPs) is a common method to simplify complex control scenarios in a system on a chip (SoC) architecture. These managing processors are typically integrated within a SoC in order to assist a user (e.g. a programmer) to control a very large SoC.

Complex SoC architectures generally require hundreds of commands in order to function in a desired mode of operation. If one or more of the commands is/are incorrect, the complex SoC architecture may not function as desired. Therefore, managing processors are generally configured to allow a user to input a single command to the managing processor, which may then be expanded into an enormous control flow by the managing processor, or provide a platform for control processes running in the background of the SoC.

A problem with a use of such managing processors in SoC architectures is that they can remain in an 'idle' state for a considerable amount of time. This is particularly the case for configuration processors, which are active during a configuration phase, and then stay online, but in an idle state, in case 'on the fly' changes are required. Generally, these 'on the fly' changes are infrequent, and are usually spaced widely apart in time. As a result, there is typically a large amount of processing bandwidth that is not being used at any particular point in time. Thus far, this inefficiency of the managing processor has been addressed by creating specialized efficient processors (in addition to other trivial steps, such as introducing additional power management routines, etc.) or architectures that support the minimum number of possible processors.

Referring to FIG. 1, a known block diagram of a hardware management module 140 on board 115 is illustrated. The hardware management module 140 performs hardware management for a modular platform system (not shown).

The hardware management module 140 is implemented as a separate component from and/or residing within one or more of a board management controller 110, a processor 120, a chipset controller 130, a mezzanine card 145 or a memory 148. These components of board 115 are all coupled via communication channels 105. Communication channels 105 contain communication links such as fabric interfaces, in order to facilitate the forwarding of data and/or instructions between components within board 115 and/or to/from components remote to board 115, which are facilitated by communication links 112 and management bus 150.

In the case of FIG. 1, this known hardware management module provides a general purpose dedicated hardware to perform certain management tasks. However, such a known dedicated hardware management module is not able to perform additional functionality, and cannot be utilised for other tasks when in an idle state, without adding dedicated hardware to perform the required task.

SUMMARY OF THE INVENTION

The present invention provides a system on a chip and method for increasing functionality of a managing processor in a system on a chip as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

Figure 1:
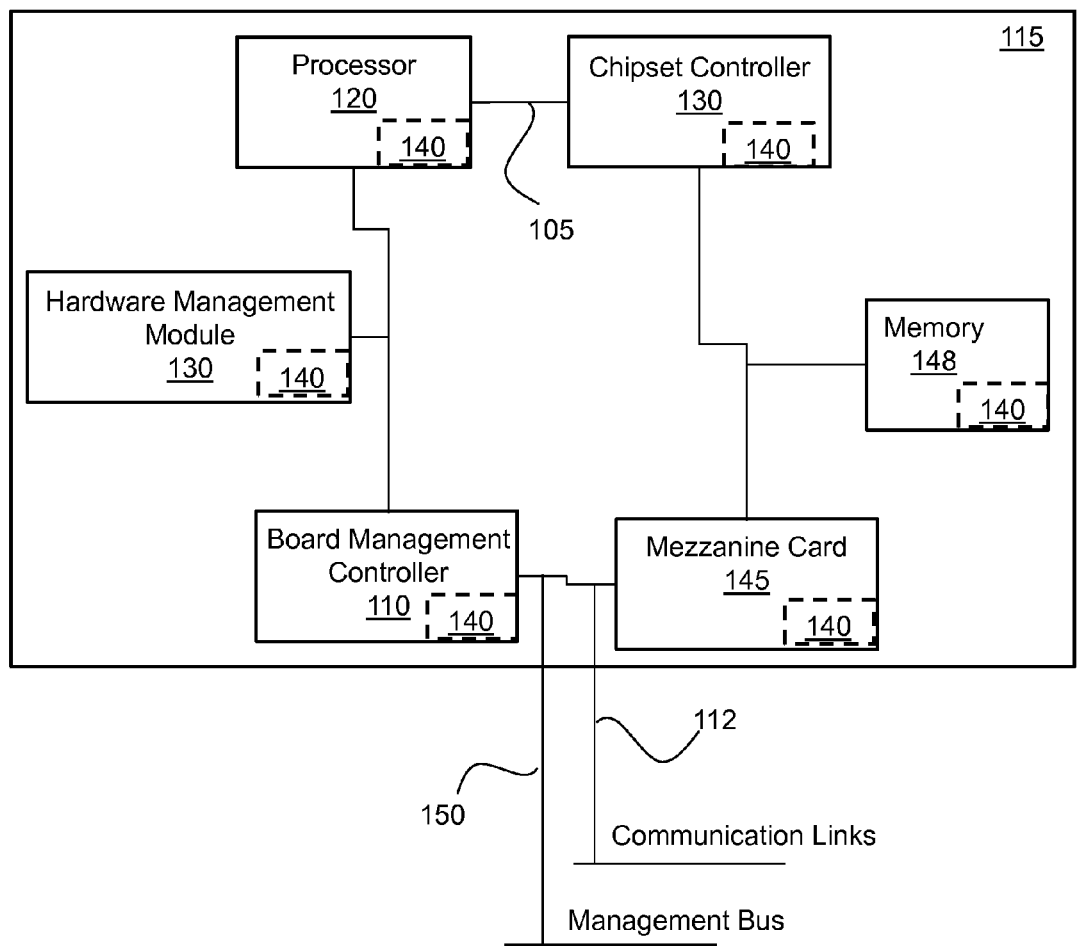
FIG. 1 illustrates a block diagram of a known hardware management module.

Because the illustrated embodiments of the present invention may, for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

Examples of the invention describe a system on a chip comprising a managing processor for controlling operations of the system on a chip. The managing processor comprises a core monitor control logic circuit operable to: receive at least one instruction; determine whether the instruction is an activation instruction; determine whether the managing processor is in or transitioning to an idle state; and transition the managing processor from a first mode of operation to a second mode of operation, in response to the instruction being an activation instruction and the managing processor being in or transitioning to an idle state. In some examples, a dynamic, modifiable monitoring operation may be achieved using an algorithm (the term 'algorithm' hereinafter also used interchangeably with the term 'code'). For example, in response to an event happening, the managing processor can activate code 'A'. By use of the algorithm the managing processor can be reconfigured and the same event can alternatively activate code 'B'. In code 'A' the managing processor may read a register from the monitored IP port and write it out, whereas in code 'B' the managing processor may wait to see if another event happens. This dynamic flexibility is very powerful, as it allows the SoC to fine tune the various monitoring operations, for example by changing, modifying or adding monitoring algorithms based on any determined results.

In examples of the invention, the data processing device may, for example, be implemented as a microprocessor, such as a general purpose microprocessor, a microcontroller, a digital signal processor or other suitable type of microprocessor. The microprocessor may, for example, comprise one, two or more central processing units (CPU) or cores. Additionally, the microprocessor may comprise one or more peripherals, such as hardware accelerators, co-processors or otherwise, and/or memory, such as on-chip flash or RAM. For instance, if the SoC has powerful general purpose cores, digital signaling cores, digital signaling accelerators and image coding and decoding accelerator, the SoC may be configured as, say, a digital image processor. Alternatively, for example, if the SoC has communication protocol accelerators, data management accelerators, etc., the SoC may be configured as, say, a networking processor. In some examples, the software used in the SoC may be tailor made for networking, in that it may be used to activate various hardware accelerators in such a way as to construct a stream of data traffic that complies to networking protocols. In this manner, by use of the SoC configured as, say, a networking processor may allow high-bandwidth traffic to be supported, which could not otherwise be supported using general purpose cores since they would need to run significant amounts of code with high line rates per port and relatively low power.

Figure 2:
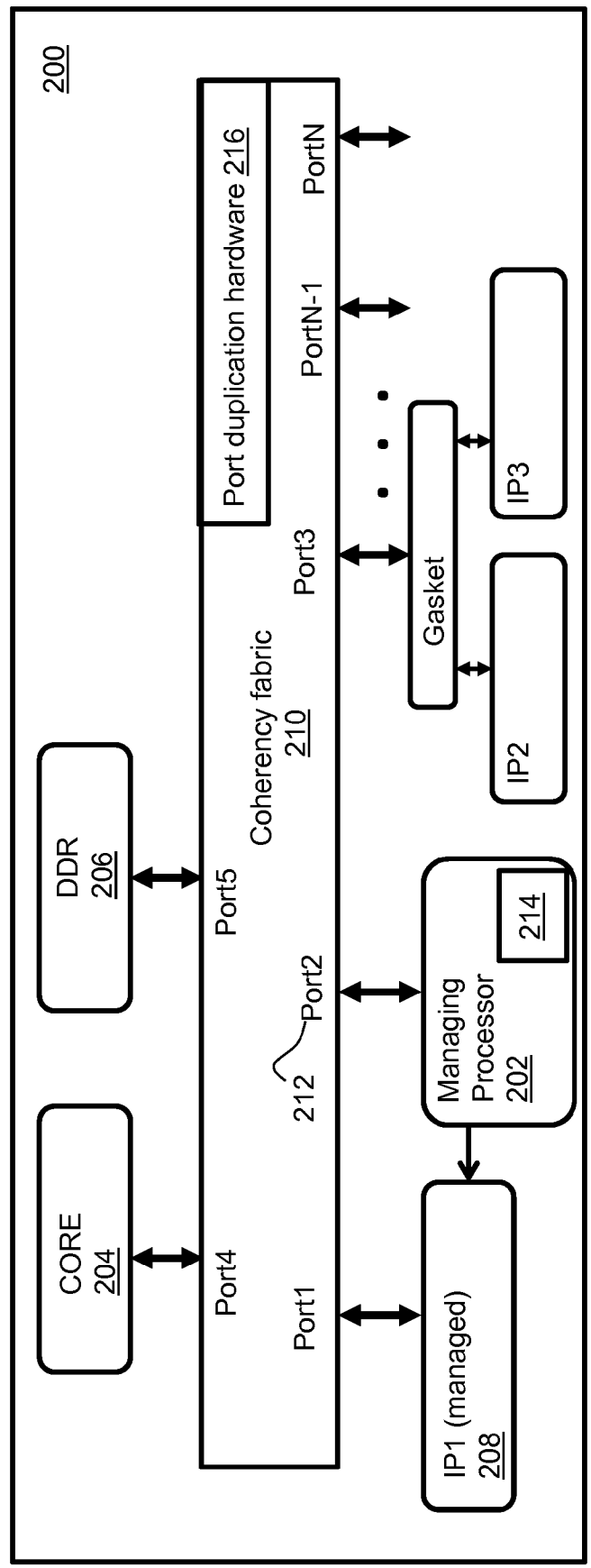
FIG. 2 illustrates an example block diagram of a System on a chip.

Referring to FIG. 2, a block diagram of an example SoC 200 is illustrated, according to some example embodiments of the invention. In this example, a managing processor 202, core 204, memory 206, for example double data rate (DDR) random access memory (RAM), and at least one intellectual property (IP) logic circuit 208 (which may comprise anything, such as a security engine to an Ethernet controller), may be comprised within the SoC 200, wherein all of the above-mentioned logic circuits may be operably coupled to a coherency fabric 210. In some examples, the coherency fabric 210 may be an interface fabric that provides interconnections amongst the core 204, peripheral devices (not shown), secure memory (not shown), and system memory, for example DDR RAM 206.

The coherency fabric 210 may allow synchronisation of ports of the SoC 200, thereby allowing data that is transmitted within the SoC 200 to be 'coherent'. Therefore, transmitted data may be synchronised with caches and memories of the SoC 200, thereby allowing the correct and/or synchronised data to be obtained and passed between respective components. In operation, the coherency fabric 210 may be arranged to receive data on one port, for example port-4 from core 204, for passing to another port, say port-5 for DDR 206.

In accordance with some examples of the invention, the managing processor 202 has been adapted to comprise a controller (for example in a form of a core monitor control logic circuit), which controls the operational functionality of the managing processor 202 to enable the managing processor 202 to perform additional functions in contrast to entering quiet or 'idle' state periods. One such additional function is to monitor communications to/from one or more ports attached to coherency fabric 210 within the SoC 200. In this manner, managing processor 202 is able to perform useful additional functions, such as being responsive to dynamic instructions to perform data and/or port monitoring capability, in contrast to the managing processor 202 typically remaining in an 'idle' state.

For example, the SoC 200 may determine that there is a need and/or a benefit to monitor communications to from port-1 IP1 208. In this context, the managing processor 202 may receive one or more instructions, say from core 204 via the coherency fabric 210, to re-configure itself to perform an additional monitoring capability in contrast to entering an 'idle' state. In one example, communications to/from port-1 coupled to IP1 208 are copied and the copied representation of the communications routed to managing processor 202.

Thus, in a first mode of operation, the coherency fabric acts as a media interface between all the SoC 200 elements, wherein the managing processor 202 is operable to send and receive data through its port, in this example port-2 212. In this first, normal, mode of operation, the managing processor 202 is responsive to commands from core 204 and or DDR RAM 206, amongst others. In accordance with some examples, and once the managing processor 202 has completed its allocated normal tasks, it may transition to a second mode of operation.

In the second mode of operation, 'Port duplication hardware' (PDH) 216) located within the coherency fabric 210 is activated to enable a copy of communications to/from a port to be monitored to be additionally routed to managing processor 202. In this example, the port duplication hardware 216 may already have been present within the SoC 200 or coherency fabric 210, and has been adapted to be utilised by the managing processor 202 for the additional port monitoring capability.

Thus, in this example, the second mode of operation may follow on from the first mode of operation, once the managing processor 202 has completed its normal tasks. In transitioning to the second mode of operation, an upper software layer (not shown) located in the core 204 may activate data and/or port monitoring capability function of the managing processor 202 by applying a new command coded in the managing processor's 202 memory 214, for example via an instruction from DDR random access memory (RAM) 206. Upon receiving this new command, the managing processor 202 may fetch new code, for example monitor activation control code from DDR RAM 206 for installation in and/or use by, say, the controller in managing processor 202, as described in relation to FIG. 3. In some examples, the managing processor 202 may utilise code already residing in its memory 214, which may be an instruction RAM.

A number of advantages in activating the innovation by upper layer software exist, including:
1. The upper layer software knows what is active in the system and knows when it wants to monitor actions, activity, processes, data, etc.
2. The upper layer software is the entity decoding the monitored data, so it needs to be aware when the monitored data is available and address it.
3. The use of upper layer software allows for more flexibility, as the programmer is able to insert several types of monitoring code and activate them based on its needs.

It should be noted that in other example embodiments, a point-to-point network may equally be constructed to replace the coherency fabric 210 of FIG. 2, and benefit from the concepts herein described. Also, it is envisaged in other examples that the managing processor 202 may work automatically when in idle mode of operation, whereby the monitoring function may be switched on automatically.

Figure 3:
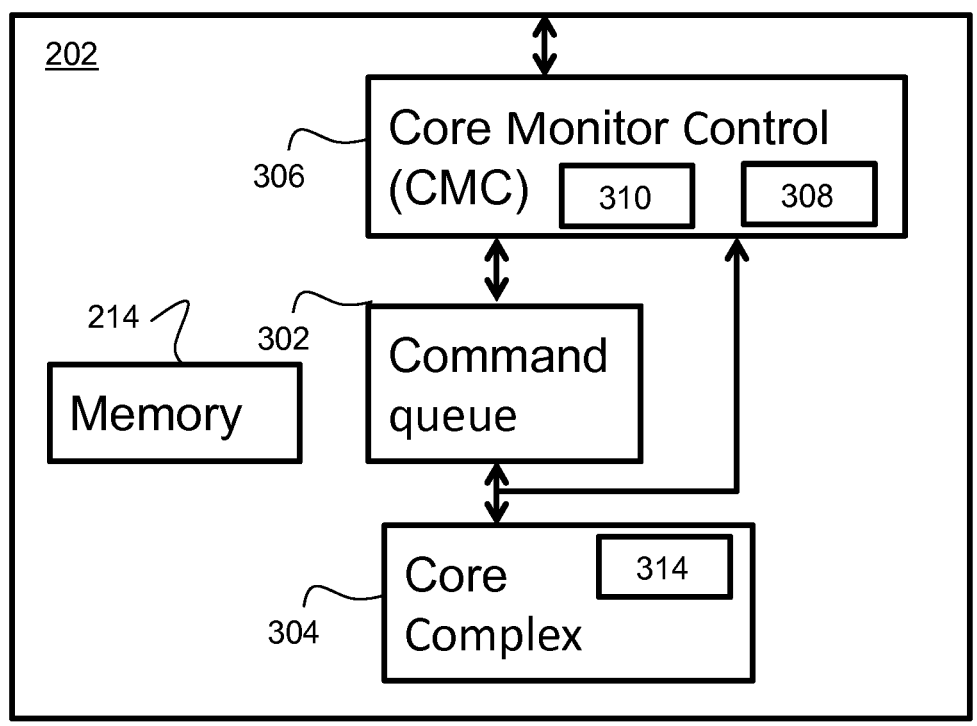
FIG. 3 illustrates an example of a managing processor.

Referring to FIG. 3, a more detailed block diagram of an example of managing processor 202 is illustrated. In this example, managing processor 202 comprises at least memory 214, command queue logic circuit 302 and core complex 304. Additionally, according to some example embodiments, the managing processor 202 further comprises a core monitor control (CMC) logic circuit 306. With reference to the second mode of operation described in FIG. 2, the CMC logic circuit 306 could be configured to operate in a bypass mode.

In this example, the CMC logic circuit 306 may comprise a buffer 310 and one or more registers 308. In some examples, the CMC logic circuit 306 may be memory mapped, for example it comprises one or more registers 308 that are programmable by upper layer software to monitor communications to identify at least one activation instruction, for example received from core 204 of FIG. 2.

In this example, the CMC logic circuit 306 may be implemented as a controller, which may be responsible for balancing the original managing processor usage (in a first mode of operation) with a possible additional managing processor usage if it is arranged to perform an additional data and/or port monitoring capability in a second mode of operation. In this regard, the managing processor receives 'on-the-fly' configuration commands and dynamically transitions between a monitoring mode to a normal mode, and as such a balancing operation a soft transition is performed to guarantee the proper quality of service to the first mode command. In some examples, the additional data and/or port monitoring capability may be performed using a software algorithm residing in the one or more registers 308. The CMC logic circuit 306 may further control the command queue 302 and ensure that it only activates when there is no configuration debug and port duplication hardware that is active.

Therefore, in such examples, the command queue 302 may be arranged to exert priority over background core accesses, such as those from the CMC logic circuit 306 when configured to perform an additional data and/or port monitoring capability.

In some examples, the managing processor 202 may be also connected to a debug network, such as a high performance network that is designed to accumulate debug data into high speed frames and transmit it out without causing an impact on the coherency fabric 210. By controlling the activation of this network the CMC logic circuit 306 may be able to transmit the monitoring results without causing an impact on the timing of transactions moving through the coherency fabric, thereby allowing an accurate replication of scenarios. It is important for all monitoring devices not to change the process they monitor, especially in cases of dynamic monitoring where the same scenario is required to be run over and over again to facilitate fine tuning.

In some examples, the at least one activation instruction may comprise a unique identity (ID), which separates it from regular commands received by the CMC logic circuit 306.

Further, the at least one activation instruction may comprise monitoring information, for example a port to monitor and a monitoring type, which may indicate the type of monitoring that is to be performed. In some examples, information regarding the type of monitoring to be performed may be user defined.

In some examples, the monitoring type may comprise one or more of the following: matching data patterns, matching bus attributes (e.g. counting cacheable transactions), obtain an indication of a monitoring code to fetch, match to a sequence of events, send an interrupt to a controller core to affect a functional flow of data within the system, etc. This means that the monitoring operation is capable of seeking specific transactions, for example, containing a specific data pattern and send data to the cache even though it may not have a high security level. Thus, once monitored, the algorithm can do whatever it sees fit and search for more combinations, dependent upon what is written in the code.

Further, in some examples, the monitoring type may relate to matching a sequence of events, and creating an interrupt if there is a certain command followed by another command etc. The managing processor 202 is connected to an interrupt controller (not shown) in the SoC. In some examples, the code is able to program the interrupt controller to raise an interrupt, thereby alerting all the processors in the SoC (functional processors in core 204) that this event happened and that they can take action too. For example, if a core 204 writes to the IP with the wrong bus attributes, an interrupt can be raised and the core 204 is able to correct the bus attributes.

Therefore, in some examples of the invention, the monitoring type may be an indication of a monitoring code to fetch, for example a monitoring command to be fetched from DDR or internal RAM in the managing processor 202.

Therefore, in some aspects of the invention, the managing processor 202 may be adapted to additionally perform a monitoring function that is dynamically activated whilst the managing processor 202 is in, or transitioning to, an idle state.

In some examples, the CMC logic circuit 306 may bypass the command queue 302 and utilise its own buffer 310. In some examples, this may be because the command queue 302 cannot be accessed by the CMC logic circuit 306. If the CMC logic circuit 306 were to access the command queue 302, once the managing processor 202 was activated, the command queue 302 would need to be completely cleared, e.g. flushed, each time the managing processor 202 was reutilised. This additional clearing operation would take time and, therefore, it may be beneficial to stop the CMC logic circuit 306, return to the original managing processor 202 operation, and once completed, return to the CMC logic circuit 306 operation, without allowing the CMC logic circuit 306 to access the command queue 302.

In some examples, the CMC logic circuit 306 may only access cores, for example core complex 304, on a condition that the original command queue 302 is empty. Further, the CMC logic circuit 306 may bypass the command queue 302 in order to prevent any priority issues with any original commands.

In some examples, once the monitoring command has been received, and the core complex 304 is free to handle the instruction, the CMC logic circuit 306 may interrogate the monitoring command.

In some examples, the core complex 304 may not be free to handle the received instruction if, for example, it was currently busy with a managing processor 202 command. This may be because a single command to the managing processor 202 can result in thousands of actions by the managing processor 202. Therefore, the CMC logic circuit 306 may only fetch and read a relevant MAC once the managing processor 202 has completed its current task(s).

After the CMC logic circuit 306 has read the relevant MAC, it may subsequently activate a PDH logic circuit, for example PDH 216, which may create a mirror between a port to be monitored (provided by the activation instruction) and a relevant managing processor's 202 port. Further, any transactions to the monitored port may also be directed to the same relevant port of the managing processor 202.

In some examples, the managing processor 202, which may have been reconfigured via the CMC logic circuit 306, may be operable to perform additional functions, such as 'sniffing' communications to the monitored port, and, in some examples, communications from the monitored port.

According to the monitoring type, in some examples, a processing code may be selected or brought from DDR, for example DDR RAM 206 of FIG. 2. This processing code may also hold a location of where to write/send a monitoring output. Therefore, in some examples, there may be a number of functions that may be monitored, and dependent on what function(s) is/are to be monitored, a processing code may be selected, which may be retrieved from DDR 206, which may identify a location to send the monitored port(s).

In some other examples, the CMC logic circuit 306 may be operable to activate a core complex debug network 314 within the core complex 304 and send an accumulated trace through it, which may be performed by, for example, the CMC logic circuit 306 choosing a different processing code, or in the type of coding. In this example, the code read by the CMC logic circuit 306 may have its own configuration data, allowing activation of the debug network.

In some examples, the CMC logic circuit 306 may be able to access the core complex debug network 314 in the core complex 304, in order to debug any data that may be retrieved from the core complex 304. In some examples, a decision on whether or not to route core data through the core complex debug network 314 may be achieved using a different code or monitoring type in the MAC code. In this example, an accumulated trace may comprise compressed a plurality of monitoring results, which may be transmitted via a debug port to DDR, for example DDR RAM 206. Therefore, in this example, the CMC module 306 may be capable of bypassing the command queue 302.

From this point onwards, the core complex 304 may make a copy of every transaction to the monitored port and perform required analysis on the copied transactions. The core complex 304 may be required to copy and perform analysis on every transaction so that it can identify the monitoring sequences that it wishes to monitor.

If a subsequent configuration sequence is received by the managing processor 202, the CMC logic circuit 306 may send an interrupt command to the core complex 304, and regular programming may recommence. Further, once regular programming has been completed, and the managing processor 202 would otherwise enter an 'idle' state, the CMC logic circuit 306 may 'push' the command queue 302 again for continuous monitoring, unless instructed not to by another command.

Therefore, in some examples of the invention, a monitoring exercise may be performed by the managing processor 202 in contrast to it being in, or entering, an idle state. The monitoring exercise may subsequently be interrupted when normal operation is to be recommenced.

Thus, in some examples of the invention, a controller (such as CMC 306) has been introduced into managing processor 202 to enhance its functionality, for example by dynamically converting the managing processor 202 into a programmable, flexible and agile performance monitor in contrast to the managing processor 202 being in, or transitioning to, say, idle periods. Further, in some examples, the managing processor 202 may be capable of changing its monitoring capabilities via tailor made algorithms. In some examples, by implementing a CMC logic circuit 306 within managing processor 202, in combination with PDH 216 and one or more activation instructions, additional capabilities may be realised for the managing processor 202 to perform additional functionality, which may negate a need to provide dedicated logic circuits in other areas of the SoC 200. In some examples, there may be a cost benefit, from providing a user with a flexible way to monitor their system's behaviour, through dynamic adaptation of the managing processor functions, without needing to add or modify significant hardware resources.

Figure 4:
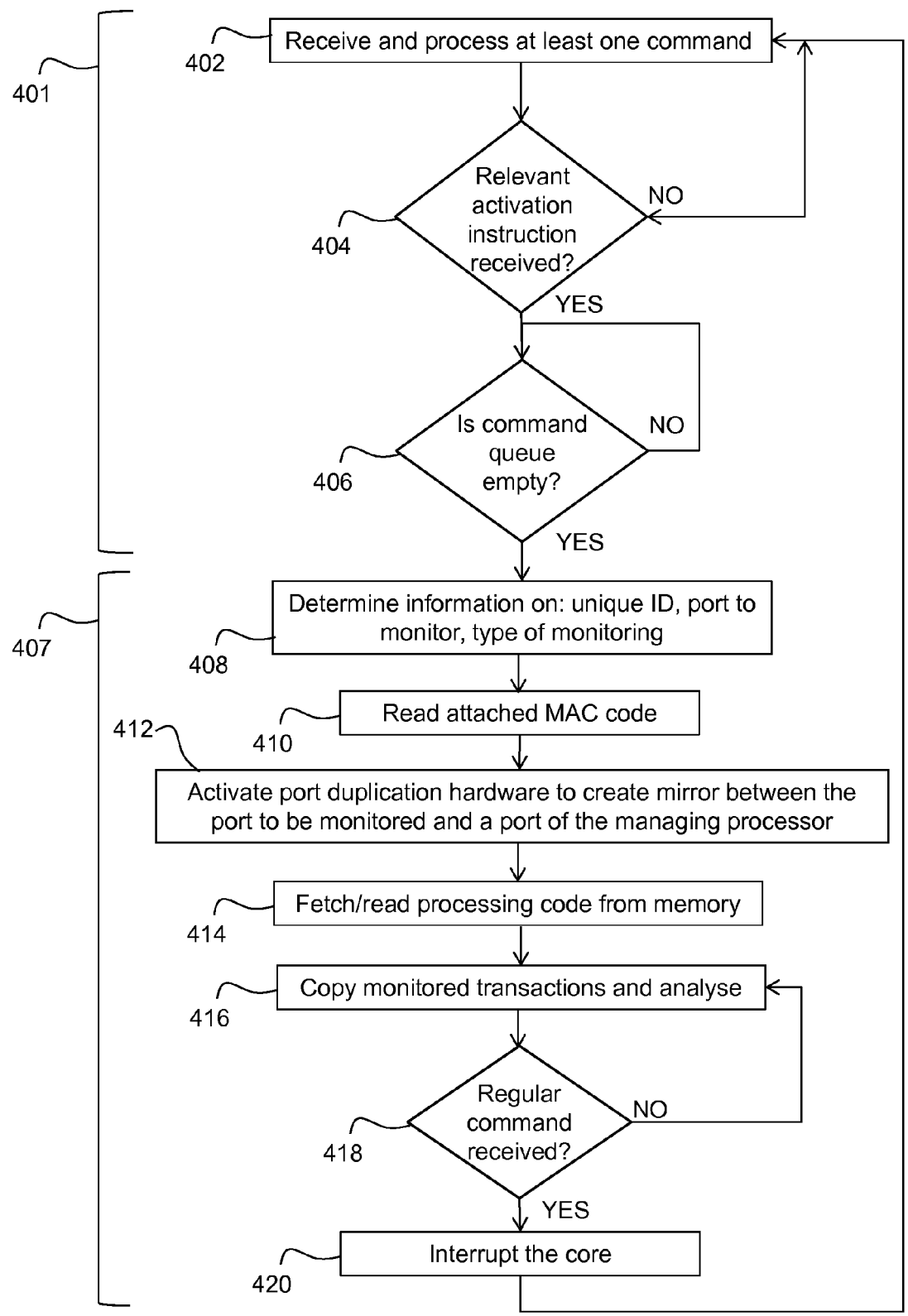
FIG. 4 illustrates an example of a flow chart operation of the managing processor.

Referring to FIG. 4, a flow chart illustrates an operation of a managing processor of a system on a chip. Initially, at 402, the managing processor (say managing processor 202 of FIG. 2) may be functioning in a first mode of operation 401, for example as a configuration engine. Therefore, the managing processor 202 may process a received command and access a memory, for example DDR, in order to perform one or more functions. In this first mode of operation 401, a core monitor control logic circuit may be in a bypass mode of operation, wherein monitoring processes for example may be interrupted during the managing processor's configuration phase.

At 404, a CMC logic circuit within the managing processor may determine whether there is a relevant activation instruction received from the upper layer software (e.g. core 204), to initiate a monitoring mode of operation. If it is determined by the CMC logic circuit that there is a relevant activation instruction, the process may transition to 406, wherein the activation instruction may be interrogated in later steps. Otherwise, if the CMC logic circuit determines at 404 that there is not a relevant activation instruction, the process may loop to 402, and the managing processor may continue to operate in the first mode of operation 401.

At 406, the CMC logic circuit may determine whether a command queue within the managing processor is empty, which can indicate that the managing processor is in, or transitioning to, an idle state. If it is determined that the managing processor's command queue is empty, the CMC logic circuit may activate a command queue bypass mode, and transition the managing processor into a second mode of operation 407. If, however, it is determined that the command queue is not empty, the CMC logic circuit may enter a continuous loop monitoring the command queue until it is determined that the command queue is empty.

At 408, the at least one received activation instruction may be interrogated by the CMC, in order to determine information regarding, for example, one or more of: a unique identifier (ID), an indication of a port to monitor, and the type of monitoring to be performed, which may be a monitoring command to be fetched, i.e. an indication of what monitoring code to fetch.

In some examples, the type of monitoring to be performed may be, for example, one or more of the following: matching certain data patterns, matching attributes (counting all cacheable transactions), and matching a sequence of events, creating an interrupt to core 204 if there is a certain command, followed by another command etc.

At 410, the managing processor may read an attached MAC code within the at least one received activation instruction. In some examples, the CMC logic circuit may not be free to receive the MAC code due to on-going actions by the managing processor.

At 412, the CMC logic circuit may activate a PDH, which may create a mirror between the port to be monitored and a relevant port of the managing processor, wherein all transactions bound for and/or from the to be monitored port may also be directed to the mirrored port of the managing processor.

At 414, depending on the monitoring code read from the attached MAC in 410, a processing code may be selected or fetched from memory, for example DDR RAM 206 of FIG. 2. This code may comprise a location of where to write an output of the monitoring operation. Further, in some examples, the CMC may be operable to activate a core complex debug network 314 and send an accumulated trace through it, for example by choosing a different code or in the type of coding. In some examples, the accumulated trace may comprise a plurality of monitoring results, which may be transmitted via a debug port to DDR, for example DDR RAM 206.

At 416, a resultant copy of monitored transactions, which in some examples may be a subset or all monitored transactions, may be passed to a core, for example core complex 304, and analysis performed on the copied transactions by the core.

At 418, the CMC logic circuit may determine whether a regular command, for example a configuration command, has been received. If it is determined that a regular command has been received, the CMC logic circuit may transition to 420 and interrupt the core, allowing the core to return to regular processing of commands. If, however, it is determined at 418 that there are no received regular commands, the CMC logic circuit may not interrupt the core and, therefore, monitoring and analysis of copied transactions may continue.

In some examples, if the CMC logic circuit interrupts the core at 420, the CMC logic circuit may 'push' for previous or new monitoring instructions and/or commands, for example activation instructions, once the processing of regular commands has been completed. In some examples, the CMC logic circuit may perform continuous monitoring, unless instructed not to do so by another command, for example a higher-priority command.

Therefore, utilising some aspects of the invention, additional monitoring capability may be added to existing resources through a dynamic re-configuration of functionality, without a need to add further hardware.

Further, utilising some aspects of the invention may additionally introduce a capability of integrating new queries and data gathering, which may have previously been undefined. Therefore, exploiting, for example, idle times within the hardware (such as idle times of the managing processor) it is possible to introduce these new capabilities without any performance impact or additional hardware being required.

Furthermore, some aspects of the invention may allow a flexible monitoring capability to be implemented, which may also serve as a debug funnel, where information may be conveyed over a debug connection. Advantageously, this may prevent a requirement to activate an entire grid during, say, light debug loads.

As illustrated, aspects of the invention may be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a tangible and non-transitory computer readable storage medium or transmitted to the computer system via a computer readable transmission medium. All or some of the computer program may be provided on computer readable media permanently, removably or remotely coupled to an information processing system. The tangible and non-transitory computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic circuits/blocks are merely illustrative and that alternative embodiments may merge logic circuits/blocks or circuit elements or components or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A system on a chip comprising a managing processor for controlling operations of the system on a chip, the managing processor comprising:
    a core monitor control logic circuit operable to:
        receive at least one instruction while the managing processor is executing instructions in a first mode of operation;
        determine whether the instruction is an activation instruction;
        determine whether the managing processor is in or transitioning to an idle state in the first mode of operation;
        activate a command queue bypass mode in response to the managing processor being in or transitioning to the idle state; and
        transition the managing processor from the first mode of operation to a second mode of operation in response to the instruction being an activation instruction and the managing processor being in or transitioning to an idle state.

2. The system on a chip of claim 1, wherein the activation instruction comprises an instruction for the managing processor to perform a monitoring function in the second mode of operation.

3. The system on a chip of claim 2, wherein the activation instruction comprises at least one from a group of: a unique identifier; at least one port to monitor; a monitoring type.

4. The system on a chip of claim 3, wherein the core monitor control logic circuit is arranged to copy a subset or all communications to or from the at least one monitored port.

5. The system on a chip of claim 4, wherein core monitor control logic circuit is operably coupled to a core complex arranged to analyse the copy of the subset or all communications to or from the at least one monitored port.

6. The system on a chip of claim 3, wherein the system on a chip comprises a coherency fabric coupling a plurality of components via a plurality of ports within the system on a chip and comprising port duplication hardware (PDH), wherein the core monitor control logic circuit is arranged to copy communications to or from the at least one monitored port to a port configured by the PDH.

7. The system on a chip of claim 6, wherein dependent upon the communications or ports to be monitored, the core monitor control logic circuit is arranged to select a processing code to identify a location to output the monitored port communications.

8. The system on a chip of claim 1, wherein the activation instruction comprises an instruction to activate a core complex debug network within the managing processor and transmit an accumulated trace of monitored debug information.

9. The system on a chip of claim 8, wherein the monitoring type comprises at least one from a group of: match data patterns, match bus attributes, obtain an indication of a monitoring code to fetch, match to a sequence of events, an ability to send an interrupt to a controller core to affect a functional flow of data within the system.

10. The system on a chip of claim 1, wherein the core monitor control logic circuit is arranged to balance a usage of the managing processor usage in the first mode of operation with additional managing processor usage in the second mode of operation.

11. The system on a chip of claim 1, wherein the managing processor comprises a command queue operably coupled to the core monitor control logic circuit, and the core monitor control logic circuit determines an idle state of the managing processor by interrogating a state of the command queue.

12. The system on a chip of claim 11 wherein the core monitor control logic circuit is arranged to control the command queue such that the command queue only activates when there is no configuration debug and port duplication hardware that is active.

13. The system on a chip of claim 11, wherein in response to the managing processor being in or transitioning to an idle state, the command queue is bypassed by the core monitor control logic circuit during the second mode of operation.

14. The system on a chip of claim 13 wherein the core monitor control logic circuit comprises at least one buffer and is arranged to bypass the command queue and use the at least one buffer when communicating with a core in the managing processor.

15. The system on a chip of claim 1, wherein the core monitor control logic circuit is operable to transition the managing processor from the second mode of operation to the first mode of operation upon receipt of a further received instruction that is not an activation instruction.

16. The system on a chip of claim 15, wherein the core monitor control logic circuit registers an interrupt with the managing processor to transition it from the second mode of operation to the first mode of operation.

17. The system on a chip of claim 1, wherein the core monitor control logic circuit is arranged to only respond to an activation instruction following the managing processor having completed the tasks performed in the first mode of operation.

18. The system on a chip of claim 1 wherein the managing processor is operably coupled via a control fabric to at least one of: at least one core, at least one peripheral, at least one memory, a secure memory.

19. A method for increasing functionality of a managing processor in a system on a chip, the method comprising:
- receiving at least one instruction while the managing processor is executing instructions in a first mode of operation;
- determining whether the instruction is an activation instruction;
- determining whether the managing processor is in or transitioning to an idle state in the first mode of operation;
- activating a command queue bypass mode in response to the managing processor being in or transitioning to the idle state; and
- transitioning the managing processor from the first mode of operation to a second mode of operation in response to the received instruction being an activation instruction and the managing processor being in or transitioning to an idle state.

* * * * *